United States Patent Office 3,128,170
Patented Apr. 7, 1964

3,128,170
METHOD FOR INHIBITING POTATO SPROUTS
Edwin K. Plant, Pittsburgh, Pa., assignor, by mesne assignments, to Pittsburgh Plate Glass Company
No Drawing. Filed Aug. 25, 1960, Ser. No. 51,765
3 Claims. (Cl. 71—2.6)

This invention deals with preventing the sprouting of edible roots and edible tubers, especially potato tubers.

After harvesting but prior to processing and/or consumption, potatoes are often stored for appreciable periods. During such periods, sprouting occurs. So extensive is sprouting that it all too frequently destroys or seriously impairs the eating and processing value of the potatoes. Losses attributable to sprouting amount annually to many millions of dollars.

Potatoes are frequently stored at cool temperatures, e.g., below about 40° F. but above those at which they freeze, in efforts to minimize sprouting. Results are far from wholly satisfactory. Sprouting is not retarded to an extent which is often desirable, especially for year round storage. Also, so-stored potatoes develop reducing sugars and in such state are not suitable for manufacture of potato chips.

According to this invention, sprouting of potato tubers is inhibited or drastically retarded to such an extent that the potatoes may be stored for extended periods without substantially deteriorating their processing quality or edibility. This is accomplishable under conditions other than those which increase the sugar content of the potatoes. These and other ends are attained most economically. Savings due to sprout inhibition far outweigh the cost.

In accordance herewith, sprouting of potatoes is prevented by treatment with isopropyl N-3-chlorophenylcarbamate. Eminently effective antisprout protection, it now has been discovered, is achieved by deposition of the carbamate upon potatoes from a stable suspension in gas of very finely divided carbamate particles. Thus, the carbamate is applied for antisprout purposes by treating potatoes with a gas stream, e.g., a stream of air, in which the carbamate is suspended in the form of particles so small they do not tend to drop out of suspension. Typical particle sizes are less than 10 microns, usually from 1 to 5 microns.

These carbamate particles, in preferred embodiments hereof, are small liquid globules (ideally 1 to 5 microns in size) of dissolved carbamate. In these globules or droplets, the carbamate is present as solute dissolved in propylene glycol or other like high boiling solvent.

Very small dosages of isopropyl N-3-chlorophenylcarbamate are effective in preventing potato sprouting. Good protection against sprouting is achieved with as little as about 0.5 pound, or even somewhat less, of isopropyl N-3-chlorophenylcarbamate per thousand bushels of potatoes. In treating large bins of potatoes (usually containing many thousands of bushels), one pound of isopropyl N-3-chlorophenylcarbamate per thousand bushels of potatoes is recommended. Larger amounts are also effective.

In typical treatments of stored potatoes, an organic solution of isopropyl N-3-chlorophenylcarbamate is dispersed as fine droplets of no greater than about 5 microns diameter into a gas stream (typically air). This gas stream contacts the potatoes, usually by virtue of circulation through the storage area occupied by the potatoes. This procedure is particularly suitable for antisprout treatment of most large scale potato storage facilities. Such storage facilities usually include appropriate ducts for circulating air through the potatoes while the potatoes are maintained in "cold" storage. Air circulated for this purpose is usually no higher than about 40° F., and not so cool as to freeze the potatoes, and is an ideal vehicle into which the carbamate may be dispersed for contact with the potatoes.

For best results to ensue, it is advisable to generate and distribute the isopropyl N-3-chlorophenylcarbamate particles according to certain preferable expedients. Thus, the isopropyl N-3-chlorophenylcarbamate should be dispersed in the form of fine liquid droplets comprising the carbamate dissolved in a water soluble, relatively high boiling organic solvent for the carbamate. One eminently suited carbamate composition from which the droplets are formed is a solution of isopropyl N-3-chlorophenylcarbamate and propylene glycol. Propylene glycol is an ideal solvent being infinitely soluble in water, sufficiently high boiling to avoid rapid volatilization, and an exceptionally good solvent for the carbamate. Due to this solvent capacity, most useful carbamate concentrations of 30 to 60 or even higher percent by weight of the carbamate and propylene glycol are attainable.

While propylene glycol is the preferred organic solvent, solvents especially water soluble organic solvents (i.e., soluble to the extent of at least 5 parts, preferably at least 10 parts per 100 parts by weight of water) normally boiling above 212° F. capable of dissolving at least 10 or 15 parts carbamate per 100 parts by their weight are useful. Since the composition is used in conjunction with edibles, the most appropriate solvents are tasteless, odorless and otherwise innocuous to human beings. Glycerine, corn oil, glycerol triacetate, mineral oil, soya bean oil, cotton seed oil, etc., illustrate some solvents which are of use.

Organic solutions of isopropyl N-3-chlorophenylcarbamate of the type hereinabove described are subdivided, ideally by mechanical means, into fine liquid droplets, usually in the 1 to 10 micron diameter size range. These droplets are suspended in a circulating gas stream which contacts the potatoes. The isopropyl N-3-chlorophenylcarbamate deposits from such a stream upon the surface of the potatoes.

Generation of the desired isopropyl N-3-chlorophenylcarbamate particles is best achieved, it has now been discovered, by mechanically subdividing a propylene glycol solution of the carbamate. Any of many devices designed or capable of mechanically subdividing the solution into fine droplets are suitable. Especially effective results are attained using devices such as the "Microsol" units manufactured by the Silver Creek Precision Corporation of Silver Creek, New York. In these "Microsol" units, the solution is presented to a pair of coaxially mounted high speed rotating discs, the action of which results in the degree of desired subdivision. Air or other appropriate gas is provided to sweep out the resulting particles.

Mechanical subdividers of this type thus generate and discharge fine particles of the carbamate solution suspended in the sweep gas, notably air. This stream of suspended carbamate particles, usually above 100° F. but below 250° F., is discharged into an air stream circulated through the storage bin. Thus, the stream of carbamate particles emanating from the device is introduced into an air stream at a temperature below the temperature of the stream emanating from the mechanical device, e.g., air stream temperatures up to 60° F. or 70° F., and the carbamate deposited therefrom onto the potatoes. The air stream is thus at a temperature well below the normal boiling point of either the carbamate or solvent. This avoids very rapid, substantial volatilization (i.e., flashing) of the solution.

The rate of carbamate distribution into the circulating stream is variable. A typical commercial scale treatment usually involving tens of thousands of bushels is accomplished in 8 to 24 hours. Most gas streams circulate through storage facilities at an ideal rate of about 0.5 cubic foot per bushel per minute, although there is considerable leeway. Thus, potatoes are treated with a gas stream quite dilute in carbamate.

The following example illustrates performance of this invention:

*Example*

Approximately 40,000 bushels of Katahdin potatoes stored to a depth of between 8 and 10 feet in a bin 115 feet by 75 feet and 25 feet high provided with appropriate ductwork for circulating air were treated with isopropyl N-3-chlorophenylcarbamate particles. In the treatment, isopropyl N-3-chlorophenylcarbamate was dispersed in a stream of air at about 40° F. circulating through the bin at a rate of approximately 0.5 cubic foot per bushel per minute. Some 8 gallons of a propylene glycol solution of isopropyl N-3-chlorophenylcarbamate containing 32 pounds (about 45 percent by weight) of the carbamate was fed at a temperature of about 195° F. to a "Microsol" Model 202 unit operated at 16,000 revolutions per minute. The discharge end of the unit was so located that it projected the carbamate globules into the air space above the potatoes, the air in such space being recirculated through the potatoes. In this fashion, the solution in the form of carbamate globules so fine they remained readily suspended in the circulating air stream was used to treat the potatoes.

Even after storage under warm temperatures normally causing sprouting, these potatoes evidenced no sprouting.

Treatment is advisedly accomplished before sprouting occurs. In the normal course, this involves reasonably prompt treatment subsequent to harvesting. Nevertheless, the treatment effectively halts sprout growth and thus is useful even after sprouting commences.

According to an embodiment hereof, potatoes are treated after their wounds of harvest have healed. By their own natural process, potatoes through a process of suberization provide a material (wound periderm) for covering cuts and bruises and protects the potato from rots. Since the carbamate inhibits suberization, treatment after suberization is recommended.

Potatoes, the surface of which are properly treated with at least 4 parts per million by their weight of isopropyl N-3-chlorophenylcarbamate, will for all practical purposes never sprout. Thus, this invention permanently protects potatoes against sprouting. Other advantages are realized.

One of the limitations encountered in the use of "cold" storage (a condition which retards to a limited extent sprouting) is the increase in the so-stored potatoes' sugars content. Under these storage conditions, potato starch converts to sugars. In the manufacture of potato chips, this is detrimental, being responsible for a browning of the potato chips. Considerable time and effort is devoted in less than completely satisfactory efforts to overcome this problem.

It is found that this browning of potato chips (and increase in sugars) may be avoided or substantially minimized by treating the potatoes with isopropyl N-3-chlorophenylcarbamate to prevent sprouting and thereafter storing the potatoes at temperatures substantially above those employed in "cold" storage, such as temperatures of at least 50° F., usually from 50° F. to 70° F. Potatoes thusly treated and stored may be used for potato chip manufacture without encountering this serious browning.

A further observed benefit is a substantial reduction in shrinkage during storage. During storage, the potatoes lose weight, reputably due to respiration and loss in moisture. Edibility and processability often is impaired by such weight losses. This respiration and weight loss is reduced significantly by treatment with isopropyl N-3-chlorophenylcarbamate. In one instance, weight loss due to storage shrinkage was halved, from 10 weight percent to 5 weight percent.

While the foregoing emphasizes the treatment of potato tubers, it is useful in antisprout treatment of surface sprouting edible roots. Besides potato tubers, sweet potatoes and yams suffer from sprouting; treatment thereof with isopropyl N-3-chlorophenylcarbamate offers incentive. Edible roots such as beets, carrots, turnips, rutabagas and radishes may also be benefited by the treatment.

It will be understood that while the present invention has been described with reference to specific details of certain embodiments it is not intended it should be construed as being limited to such specific details except insofar as they appear in the appended claims.

I claim:

1. A method of treating potatoes to inhibit the sprouting thereof and the development of reducing sugars therein during storage which comprises establishing a gas stream having a temperature of from about 40° F. to 70° F., generating finely divided liquid particles of a size of from 1 to 10 microns of an organic solution of isopropyl N-3-chlorophenylcarbamate, the organic solvent content of which consists of a water-soluble organic solvent having a normal boiling point greater than 212° F., distributing said liquid particles in said gas stream to form a stable suspension in said gas stream of said finely divided liquid particles, circulating the resulting suspension at a temperature substantially below the normal boiling point of said organic solvent and within said range of from about 40° F. to 70° F. in contact with potatoes, depositing a sprout-inhibiting concentration of isopropyl N-3-chlorophenylcarbamate from said suspension upon the potatoes and thereafter storing said potatoes at a temperature of between 50° F. and 70° F.

2. The method of claim 1 wherein said finely divided liquid particles are of a size of from 1 to 5 microns.

3. The method of claim 1 wherein the organic solvent content of the organic solution of which said liquid particles are composed consists of propylene glycol and said solution contains at least 10 parts by weight of said carbamate per 100 parts by weight of said propylene glycol.

References Cited in the file of this patent

UNITED STATES PATENTS

| | | |
|---|---|---|
| 2,341,868 | Hitchcock et al. | Feb. 15, 1944 |
| 2,435,056 | Schomer et al. | Jan. 27, 1948 |
| 2,460,792 | Pabst et al. | Feb. 1, 1949 |
| 2,510,839 | Shmidl | June 6, 1950 |

OTHER REFERENCES

Marth et al. in American Potato Journal, vol. 29, November 1952, page 268.

Anderson et al. in Science, vol. 116, Nov. 7, 1952, pages 502–503.